United States Patent Office 3,284,232
Patented Nov. 8, 1966

3,284,232
SHAPED OBJECTS OF A CRYSTALLINE POLYESTER COATED WITH A HYDROPHILIC POLYMER COMPOSITION
John R. Caldwell, Kingsport, Tenn., assignor to Eastman Kodak Company, Rochester, N.Y., a corporation of New Jersey
No Drawing. Filed Apr. 21, 1961, Ser. No. 104,547
15 Claims. (Cl. 117—138.8)

This invention relates to the treatment of polyester films, fibers and other products which are normally resistant to the permanent reception of other polymeric materials and to coloring or dyeing with various dyes, pigments, printing inks and the like. More particularly, the invention relates to a polyester film, fiber or other product having adhesively joined thereto a thin layer of an alkyd type resin containing an adjuvant, particularly another polymeric material susceptible of permanently receiving dyes, pigments, printing inks and the like.

It is known to coat polyester sheets, films and the like with resinous compositions to render the surface of such films receptive of coatings of various organic materials. For example, in U.S. Patent 2,893,896 it has been proposed to coat the surface of a polyethylene terephthalate sheet or film which has a normally hydrophobic, chemically inert surface with a halogenated fatty acid dissolved in an inorganic solvent followed by heating to a temperature of 100–300° F. The resulting sheet is said to be susceptible of receiving various coatings to make it useful as a drawing paper or medium and also to receive photo-sensitive coatings based on gelatin. Similarly in U.S. Patent 2,874,046 there is described a method of subbing a film support derived by the condensation of terephthalic acid and a glycol to render it susceptible of receiving a photo-sensitive layer by applying to the support a sub consisting of an unsaturated polyester of an aromatic compound with two aliphatically bonded hydroxy groups and unsaturated dicarboxylic acids. Likewise British Patent 770,766 describes the application to the surface of a polyester film or fiber of an unsaturated alkyd type resin. The application of alkyd type resins to polyester surfaces as disclosed in this and other prior art will not impart hydrophilic properties because it is well known that the alkyd resins are fundamentally hydrophobic in nature. Furthermore these alkyd resins have little or no affinity for many types of coloring agents represented by acid wool dyes, basic dyes and mordant type dyes. It is thus apparent that coatings of this type have severe limitations.

This invention has as an object to provide a new type of polymeric coating for a polyester film, fiber or other shaped object, which coating can permanently receive various dyes, pigments and other coloring matter.

Another object is to provide a new and improved coating for polyester films, fibers and the like which renders such products susceptible of subbing, sizing or coating with gelatin and poly(vinyl alcohol)-containing compositions.

Another object is to provide a new and improved type of sizing or finishing composition for polyester films and fibers which will improve the printability and dyeability of such films and fibers.

Another object is to provide a means of permanently associating with a normally hydrophobic polyester film, fiber or the like, a hydrophilic material which is normally incompatible therewith.

A further object is to provide high-melting crystalline linear polyester films, fibers and the like having greatly improved receptivity toward such substances as dyes, pigments, printing inks, gelatin and poly(vinyl alcohol)-containing coating or subbing compositions.

A still further object is to provide a means of bonding finely divided white or colored pigments and other substances to the surface of a film or fiber composed of a hydrophilic high-melting crystalline linear polyester.

Other objects will appear hereinafter.

These objects are accomplished by the following invention which comprises applying to the surface of a normally hydrophobic and solvent-resistant polyester film, fiber or other shaped object a polymeric coating comprising an unsaturated alkyd-type polyester resin as a bonding carrier or bonding matrix which contains another polymeric material which is normally incompatible with or nonadhesive with respect to the polyester surface. According to one embodiment of the invention, an unsaturated polyester resin of the alkyd type derived by the esterification of a glycol with maleic or fumaric acid is employed as the bonding carrier or bonding matrix. In another embodiment of the invention, the unsaturated polyester resin is derived by the esterification of glycerine α-allyl ether with a dicarboxylic acid. In either case, in accordance with the invention, the unsaturated polyester resin coating contains another substance or adjuvant which it is desired to associate with the original polyester material of the film, fiber or other shaped object. Thus, for example, the unsaturated polyester resin may contain poly(N-isopropylacrylamide), a hydrophilic and water-soluble polymer, as the added component. This aspect of the invention wherein the unsaturated polyester contains nitrogen is now claimed in our continuation-in-part application Serial No. 329,303 filed December 9, 1963. Likewise, other polymeric material of acidic or basic nature such as polyacrylic acid and poly(vinyl pyridine) can in this manner be permanently bonded to the polyester surface. In like manner, the unsaturated polyester resin coating may contain finely divided inorganic or organic pigments, thus affording a means of permanently and satisfactorily coloring a polyester film, fiber or other product not hitherto susceptible of such treatment.

The polyester material which can be coated or sized by the present invention to render the material permanently receptive of dyes, pigments, and other materials and also susceptible of the satisfactory deposition of gelatin and poly(vinyl alcohol) containing layers such as subs or gelatino-silver halide emulsions and of various textiles sizing compositions containing gelatin, resins and other materials which are those commonly employed for the manufacture of textile fibers and for the production of photographic film, sheets, molded objects and other products. Thus, the polyesters treated in accordance with this invention can be most advantageously derived from terephthalic acid, 4,4'-sulfonyldibenzoic acid, 4,4'-diphenic acid, 1,2 - di(p - carboxyphenyl) - ethane, 1,2 - di-(p - carboxyphenoxy) - ethane, 4,4' - dicarboxy - diphenyl ether, and the various esters of these acids such as the lower alkyl diesters. These compounds can be generically grouped as hexacarbocyclic nuclear dicarboxylic bifunctional compounds wherein the carboxyl radicals are nuclearly situated in a para relationship. Such compounds can be reacted in accordance with the well-known techniques, illustrated in numerous issued patents, with bifunctional glycols containing from about 2 to about 10 carbon atoms. Examples of such glycols include ethylene glycol, tetramethylene glycol, 2,2,4,4-tetraalkyl-1,3-cyclobutanediol, pentamethylene glycol, neopentylene glycol, 1,4 - cyclohexanedimethanol, quinitol, 1,4 - bis(hydroxyethyl)benzene, etc. Illustrative of the more advantageous polyesters are poly(ethylene terephthalate), the polyester from pentamethylene glycol and 4,4'-sulfonyldibenzoic acid, the polyester from 1,4-cyclohexanedimethanol and terephthalic acid and various modified polyesters related thereto, e.g., those wherein up to 30 mole percent of another aromatic dicarboxylic acid or an aliphatic dicarboxylic acid is employed as a modifier.

Polyesters which give outstandingly superior products when mixed with or coated on and fused with the unsaturated alkyd-type polyesters herein described, in accordance with the invention, are those prepared by reacting 1,4-cyclohexanedimethanol with one or more aromatic dicarboxylic acids such as terephthalic acid.

Another valuable class of polyesters that can be successfully treated by the process of the invention are those obtained from compounds that contain 2 aromatic hydroxy groups. These include the polycarbonates and dicarboxylic acid polyesters of compounds containing 2 aromatic hydroxy groups having the structure

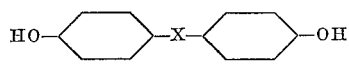

where X is an alkylene or cyclic alkylene radical.

As will be more fully set forth hereinafter, the unsaturated alkyd-type polyester resins may be prepared by methods well known to the art. In the first class of the compounds referred to above, that is, polyesters obtained by the reaction of a glycol with maleic or fumaric acid, the polyester may be prepared by reacting the acid or its anhydride with the glycol by heating at a temperature of 200–240° C. for several hours. Alternatively, the ester of the acid may be heated with the glycol in the presence of suitable ester-interchange catalysts. Suitable glycols include ethylene, propylene, tetramethylene, diethylene and triethylene glycols. Branched chain or cyclic glycols such as 2,2-dimethylpropane-1,3-diol and 1,4-cyclohexanedimethanol may also be used.

The unsaturated alkyd-type polyester resins of the second class referred to above may be prepared as described in U.S. Patent 2,448,258. For example, glycerine α-allyl ether is heated with a dicarboxylic acid, anhydride or ester to give a substantially linear polymer. A small amount of glycerine or pentaerythritol can be included in the formula to introduce a limited amount of cross-linking. Suitable acids include succinic, adipic, o-phthalic, isophthalic, terephthalic, cyclohexane-1,4-dicarboxylic, cyclohexane-1,3-dicarboxylic and bicycloheptane-2,3-dicarboxylic acids as well as mixtures of these acids. Other glycols can be used to the extent of 10–40 mole percent. Unsaturated acids may be used in the production of these polyesters, such acids being represented by maleic, fumaric, cyclohexene-1,2-dicarboxylic, and bicycloheptene-2,3-dicarboxylic acids.

The composition applied to the polyester film or fiber surface contains at least 50% and preferably 60–80% by weight of the unsaturated alkyd polyester.

The unsaturated alkyd-type polyesters referred to above are conveniently applied to polyester films, fibers and other shaped objects from solutions in various solvents such as alcohol, ethyl acetate, toluene, methylene chloride, ethylene dichloride, and dioxane or various mixtures thereof. The polyesters may also be emulsified in water by methods known to the art and applied to the polyester film, fiber or other object as a dispersion. The application of such solutions or emulsions may be accomplished in any convenient manner as by spraying, application by applicator rolls, immersion or other well-known techniques. It should be noted in this connection that only by solution application can extremely thin layers or coatings be deposited on such objects as films or fibers. Regardless of the method of deposition of the unsaturated polyester material, the treated polyester product is heated to drive off the solvent and to effect cross-linking in the deposited polyester resin. Cross-linking may also be effectuated by means of peroxide catalyst added to the unsaturated polyester resin solution, if desired. Likewise, the deposited resin may be cured by heating in air in the presence of manganese or cobalt compounds such as oleate or naphthenate salts of these metals.

In connection with the matter of depositing or coating the unsaturated alkyd polyester resin on a polyester surface and the curing of the deposited layer to form a firm coating on the treated object, it is one of the unusual features of our invention that the unsaturated polyester resin can be made to adhere to the polyester surface to which it is applied merely by heating to drive off the solvent and to cure or insolubilize the deposited resin layer. This is a most unusual and unexpected effect, particularly when it is taken into consideration that the solvent medium employed has no solvating, swelling or etching effect on the polyester surface to which the solution is applied. Nevertheless, a firm and permanent bond is formed between the deposited unsaturated polyester and the polyester surface to which it is applied.

It is also one of the notable and unusual aspects of my invention that this phenomenon makes possible the deposition on a normally insoluble and hydrophobic polyester surface, a permanent coating containing dispersed therein a hydrophilic material, such as another type of polymer which is, itself, hydrophilic, and which even may be soluble in water, by merely mixing the added polymer with the unsaturated alkyd-type polyester resin solution, evaporating solvent and heating. In like manner, other adjuvants such as organic or inorganic pigments, dyes, metallic flakes and other effect materials may be permanently coated on the surface of films, fibers and other products composed of polyester material which is normally completely resistant to coloring or coating by such agents. As will be evident from this discussion, a polyester sheet material, for example, coated in the manner described with the unsaturated alkyd-type polyester resin containing a hydrophilic polymer renders the treated product susceptible of coating by materials such as gelatin or poly(vinyl alcohol)-containing compositions and also receptive to various types of printing inks. In a similar manner, polyester fibers sized with a composition containing unsaturated alkyd polyester resin and another hydrophilic polymer may be treated with other gelatin-containing sizing compositions, for example. As is the case with polyester films treated in accordance with my invention, the sizing of polyester fibers with the compositions described herein and containing various dyes, pigments and other materials makes it possible to dye polyester fibers in a manner not heretofore possible. It is also one of the outstanding and unusual features of my invention that the unsaturated alkyd-type polyester resin can be applied in accordance with the invention to bond such a wide diversity of polymeric and particulate materials to polyester films and fibers.

In the following examples and description, I have set forth several of the preferred embodiments of my invention but they are included merely for purposes of illustration and not as a limitation thereof.

*Example 1.*—Twenty-seven and six-tenths g. of glycerine α-allyl ether, 29.6 g. of phthalic anhydride, and 0.1 g. titanium butoxide catalyst were placed in a vessel equipped with a stirrer, a distillatiotn column, and an inlet for purified nitrogen. The mixture was stirred at 160° C. for 30 minutes in a nitrogen atmosphere. The temperature was then raised to 240° C. during three hours and stirring was continued at this temperature for 3–4 hours. A vacuum of 0.5 mm. was then applied for 20 minutes. The product was cooled under nitrogen. It was a viscous gum, soluble in the common solvents and is of outstanding value in coating polyester films, fibers and the like as described in certain of the examples below.

*Example 2.*—Two g. of the polyester resin described in Example 1 and one g. of poly(N,N-dimethyl-acrylamide) were dissolved in 100 cc. of dioxane, along with 0.05 g. of benzoyl peroxide. The solution was coated on a film made from poly(ethylene terephthalate) and the film was heated at 120° C. for 40 minutes to cure the resin. The film dyed readily with cellulose acetate, acid wool, and direct cotton dyes. Gelatin and poly(vinyl alcohol) coatings showed good adhesion. The treated film showed a reduced tendency to develop static electrification.

Fibers made from terephthalic acid and 1,4-cyclohexanedimethanol polyester were coated with 5–10% of the mixture described above. After the resin coating was cured, the fibers showed a reduced tendency to develop static electrification.

*Example 3.*—Ninety-eight g. of maleic anhydride, 150 g. triethylene glycol, and 0.1 g. titanium butoxide were stirred in a nitrogen atmosphere at 160° for one hour, then at 200° C. for four hours, and finally at 230° C. for two hours. A vacuum of 0.5 mm. was then applied for 20–30 minutes. The product was a viscous gum, soluble in the common solvents.

*Example 4.*—Three grams of the polyester described in Example 1 and one gram of poly(N-isopropylacrylamide) were dissolved in 100 cc. of dioxane and 0.1 gram of benzoyl peroxide was added. The solution was coated on a film made from poly(ethylene terephthalate) and the film was heated at 100–110° for 2 hours to cure the polyester. The coating had a thickness of 1 mil.

The coated film was placed in a bath containing an acid wool dye, Acid Violet 7 (C.I. No. 57). The dye bath also contained acetic acid and sodium sulfate. After 30 minutes in the dye bath at 90–100°, the film was dyed a deep violet color. Similar dye take-up was obtained with Acid Red 33 (C.I. No. 30), Acid Yellow 36 (C.I. No. 138) and Acid Blue 9 (C.I. No. 671). Films that were coated with the unsaturated polyester alone had no color or were only slightly tinted when dyed under the same conditions. This shows that the poly(N-isopropylacrylamide) took up the dye and remained bonded to the surface.

The coated film dyed well with several direct cotton dyes including Direct Yellow 4 (C.I. No. 364), Direct Orange 6 (C.I. No. 478), Direct Red 1 (C.I. No. 419) and Direct Blue 15 (C.I. No. 520). Poly(ethylene terephthalate) films that were coated with the unsaturated polyester alone did not dye with these direct cotton dyes.

A fabric made from terephthalatic acid-cyclohexanedimethanol polyester was printed with the solution of unsaturated polyester and poly(N-isopropylacrylamide). After curing, the treated fabric was immersed in a dye bath of Acid Yellow 36. The printed areas were dyed yellow.

*Example 5.*—An unsaturated polyester was made having the composition 1 mole of glycerine α-allyl ether and a mole of azelaic acid. A copolymer was made from 70 parts of ethyl acrylate and 30 parts of acrylic acid. Four grams of the unsaturated polyester and 1 gram of the ethyl acrylate-acrylic acid copolymer were dissolved in 100 cc. of methylene chloride and 0.2 g. of benzoyl peroxide was added. A film of poly(ethylene terephthalate) was coated with the solution to give a coating 0.4–0.5 mil thick, when dry. The cured, coated film dyed well with basic dyes such as Basic Yellow 2 (C.I. No. 455), Basic Red 9 (C.I. No. 676), Basic Blue 5 (C.I. No. 663) and Basic Violet 1 (C.I. No. 680). Poly(ethylene terephthalate) films coated with the unsaturated polyester alone only tinted or did not dye at all with the same dyes.

*Example 6.*—This example illustrates the use of the unsaturated polyesters for bonding pigments to film and fiber surfaces. Ten grams of the unsaturated polyester described in Example 5 were dissolved in 200 cc. of methylene chloride and 1 gram of Heliogen Blue BDS pigment (C.I. No. 74160) was dispersed in the solution. A trace of cobalt naphthenate was added as curing catalyst. The dispersion was sprayed onto a fabric made from terephthalic acid-cyclohexanedimethanol polyester. The fabric was heated at 110–120° for 1 hour to cure the unsaturated polyester. The blue pigment was firmly bonded to the fabric surface.

Titanium dioxide was used in place of the Heliogen Blue BDS, as described above. The suspension was sprayed onto a film made from 4,4'-sulfonyldibenzoic acid-pentanediol polyester. The treated film was then heated at 100° for 2 hours. The titanium dioxide imparted a matte surface to the film.

*Example 7.*—Five grams of the unsaturated polyester described in Example 3 were dissolved in 100 cc. of methylene chloride and 1.0 g. of poly(4-vinylpyridine) was added. Benzoyl peroxide (0.3 g.) was then added as curing catalyst. The solution was coated on a poly(ethylene terephthalate) film to give a thickness of 0.1–0.2 mil, when dry. After curing at 60–70° C. for 10 hours, the coated film dyed well with acid wool dyes. This coating has the property of adsorbing nickel, cobalt, and chromium ions from aqueous solutions and hence can be dyed with mordant dyes. Films coated with this poly(vinylpyridine) composition have excellent adhesion for polymers that contain free carboxyl groups such as polyacrylic acid, etc.

*Example 8.*—Five grams of the unsaturated polyester described in Example 3, 2 grams of poly(4-vinyl-pyridine) and 0.3 gram of benzoyl peroxide were dissolved in 150 cc. of methylene chloride and the solution was sprayed onto a film made from Bisphenol A polycarbonate. The coating had a thickness of 0.2–0.3 mil when dry. The film was heated at 80–90° for 4 hours to cure the coating. A solution of methyl toluenesulfonate in alcohol was then sprayed on the coated film and the film was heated at 90–100° for 2 hours. During this time the methyl toluenesulfonate reacted with the pyridine nitrogen to give a quaternary salt. The film was then washed in water and dried. This film had excellent antistatic properties.

The solution of unsaturated polyester and poly(4-vinylpyridine) was applied to a poly(ethylene terephthalate) fabric and the coating was quaternized with methyl toluenesulfonate as described above. The fabric had excellent antistatic properties. The electrical resistance across 1 square inch of the fabric was $1 \times 10^{10}$ ohms. The electrical resistance of the same fabric that had been coated with the unsaturated polyester alone was $1.5 \times 10^{14}$ ohms. It is apparent that the presence of the quaternized poly(4-vinylpyridine) greatly increased the conductivity and hence the antistatic properties of the coating.

*Example 9.*—One hundred g. of the unsaturated polyester described in Example 1, 4 g. of sodium oleyl sulfate, 10 g. of aluminum flake powder, 0.2 g. cobalt naphthenate and 900 cc. of water were placed in a high-speed colloid mill and treated at a temperature of 80–90° C. until a stable dispersion was obtained.

(A) A polyethylene terephthalate fabric was dipped into the dispersion and then pressed to twice its original weight. The water was evaporated at 120–130° and the fabric was then heated at this temperature for 30–40 minutes to cure the resin. The aluminum flake was securely bonded to the fabric surface. This fabric is useful as an awning material and as a tarpaulin for outdoor use because the aluminum flake reflects ultraviolet light and greatly improves the resistance to weathering.

(B) A polyester made from terephthalic acid and 1,4-cyclohexanedimethanol was converted to a drafted and heatset film. The film was coated on one side with the aqueous dispersion to give a layer of 1.0–1.5 mils thick, on a dry basis. After curing at 120–130° for 1 hour, the coating had excellent adhesion. This film is valuable for outdoor exposure because of its excellent weathering properties.

(C) Carbon black was used in place of the aluminum powder in A and B above.

As will also be apparent from the above examples and description, it is one of the particularly valuable aspects of the present invention that it enables the surface of a polyester film, fiber or other shaped object to be modified by the attachment of polymeric materials which contain specific functional groups. Materials containing carboxylic acid groups are of particular value as represented by those derived from acrylic acid, methacrylic acid, fumaric acid, maleic acid, itaconic acid and the like. Another useful class of functional groups is represented by tertiary amino groups such as found in di-N-alkylamino acrylates and methacrylates as well as heterocyclic nitrogen compounds containing a polymerizable vinyl group. A third class of valuable modifying agents contains amide groups such as found in the amides and N-substituted amides of acrylic acid, methacrylic acid, fumaric acid and maleic acid. This aspect of the invention wherein the unsaturated polyester contains nitrogen is now claimed in our continuation-in-part application Serial No. 329,303 filed December 9, 1963.

Reference has been made in the above examples and description to the use of adjuvants mixed with or dispersed in the deposited unsaturated alkyd polyester coating of the polyester sheet or fiber material, such adjuvants being either pigments, dyes, metallic flakes or other finely divided metallic effect materials, or another polymeric material which is normally incompatible with the polyester material of the sheet or fiber to which it is applied. While the adjuvant may be a hydrophobic type of polyester or other polymeric material, for example, it may also be a hydrophilic material. In fact, one of the particularly valuable features of my invention is the fact that hydrophilic polymers may be mixed with or dispersed in the unsaturated alkyd type polyester coating and thus render the coated object, be it sheet or fiber, more receptive toward such compositions as those normally employed for the subbing of photographic film or the sizing of textile fibers by deposition from solutions or dispersions in water or the well-known common solvents generally employed for this purpose. It will thus be evident that my invention provides an effective means for rendering the surfaces of polyester films, fibers and other shaped objects suspectible of dyeing with a wide variety of dyes and the permanent and satisfactory deposition of effect materials such as finely divided pigments, metal flakes and the like, something which was heretobefore extremely difficult, if not impossible, because of the hydrophobic nature of polyesters in general and the fact that water and the solvents commonly employed for the deposition of various coatings and sizing solutions to films, sheets and other objects are repelled by and have no solvating, swelling or other action on polyester material. My invention, as has been described in detail above, also makes possible the deposition of coatings which renders the coated polyester film, fiber or other object susceptible of permanently receiving subs and coating compositions containing gelatin, polyvinyl alcohol, rubber and the like. For example, a polyester film coated in accordance with the invention may be employed asa a photographic film base and be successfully coated directly with a gelatino-silver halide layer from an emulsion thereof. Many other advantages of the invention will be apparent to those skilled in the art.

Although the invention has been described in detail with particular reference to certain preferred embodiments thereof, variations and modifications can be effected within the spirit and scope of the invention as described hereinabove and as defined in the appended claims.

I claim:

1. A coated object comprising (A) a shaped object consisting essentially of a high-melting crystalline linear polyester selected from the group consisting of bisphenol polycarbonates and polyesters of (a) diols and (b) dicarboxylic bifunctional compounds consisting essentially of hexacarbocyclic nuclearly attached dicarboxylic bifunctional compounds wherein the carboxy radicals are nuclearly situated in a para relationship, and (B) a resin coating on said shaped object having a composition consisting essentially of (B1) from about 80 to 60% by weight of a cured unsaturated polyester resin of a polyhydric alcohol constituent and a polycarboxylic acid constituent, of which any unsaturated acid constituent constitutes at least 30 mol percent of such acid and any unsaturated alcohol constituent constitutes at least 40 mol percent of such alcohol, and (B2) from about 20 to 40% by weight of at least one of the following adjuvants selected from the group consisting of: (a) a preformed hydrophilic addition polymer derived from at least one olefinically unsaturated monomer containing a functional group selected from the group consisting of a carboxy group, a tertiary amine group and an amide group, said polymer, other than for said functional groups, being essentially composed of carbon and hydrogen atoms, and (b) an inert pigment.

2. The product of claim 1 in which the resin coating contains dispersed therein the hydrophilic addition polymer.

3. The product of claim 1 in which the resin coating contains said inert pigment.

4. The product of claim 1 in which the unsaturated polyester resin is derived from the condensation of a glycol and a dicarboxylic acid in which at least 30 mole percent of the acid component is selected from the group consisting of maleic and fumaric acids.

5. The product of claim 1 in which the unsaturated polyester resin is derived from the condensation of a glycol and a dicarboxylic acid and in which at least 40 mole percent of the glycol component is glycerine α-allyl ether.

6. The product of claim 1 in which the high-melting crystalline polyester is polyethylene terephthalate.

7. The product of claim 1 in which the high-melting crystalline polyester is derived from terephthalic acid and 1,4-cyclohexanedimethanol.

8. The product of claim 2 in which the hydrophilic addition polymer contains carboxylic acid groups.

9. The product of claim 2 in which the hydrophilic addition polymer contains tertiary amine groups.

10. The product of claim 2 in which the hydrophilic addition polymer contains amide groups.

11. The product of claim 1 in which the high-melting crystalline polyester is Bisphenol A polycarbonate.

12. The product of claim 3 in which said pigment is composed of aluminum.

13. The product of claim 3 in which said pigment is composed of titanium dioxide.

14. The product of claim 3 in which said pigment is composed of carbon black.

15. The product of claim 3 in which said pigment is composed of a phthalo-cyanine pigment.

References Cited by the Examiner

UNITED STATES PATENTS

| | | |
|---|---|---|
| 2,650,207 | 8/1953 | Rust et al. |
| 2,802,714 | 8/1957 | Olpin et al. _____ 8—18 X |
| 2,803,607 | 8/1957 | Stroh et al. |
| 2,865,891 | 12/1958 | Michel. |
| 2,882,255 | 4/1959 | Caldwell et al. |
| 2,914,498 | 11/1959 | Quarles et al. |
| 2,933,416 | 4/1960 | Haakh et al. _____ 117—38 X |
| 2,955,958 | 10/1960 | Brown _____ 117—113 |
| 2,996,475 | 8/1961 | Joyner et al. |
| 3,034,920 | 5/1962 | Waller et al. |
| 3,128,265 | 4/1964 | Caldwell _____ 117—138.8 X |

FOREIGN PATENTS

| | | |
|---|---|---|
| 846,505 | 8/1960 | Great Britain. |

WILLIAM D. MARTIN, *Primary Examiner.*

RICHARD D. NEVIUS, *Examiner.*

D. E. TOWNSEND, T. G. DAVIS, *Assistant Examiners.*